April 20, 1954  K. RAUCH  2,675,651
MACHINE FOR MAKING INTERRUPTED THREADS
ON ARCUATELY SPACED LANDS OF OBJECTS
Filed June 28, 1949  2 Sheets-Sheet 1
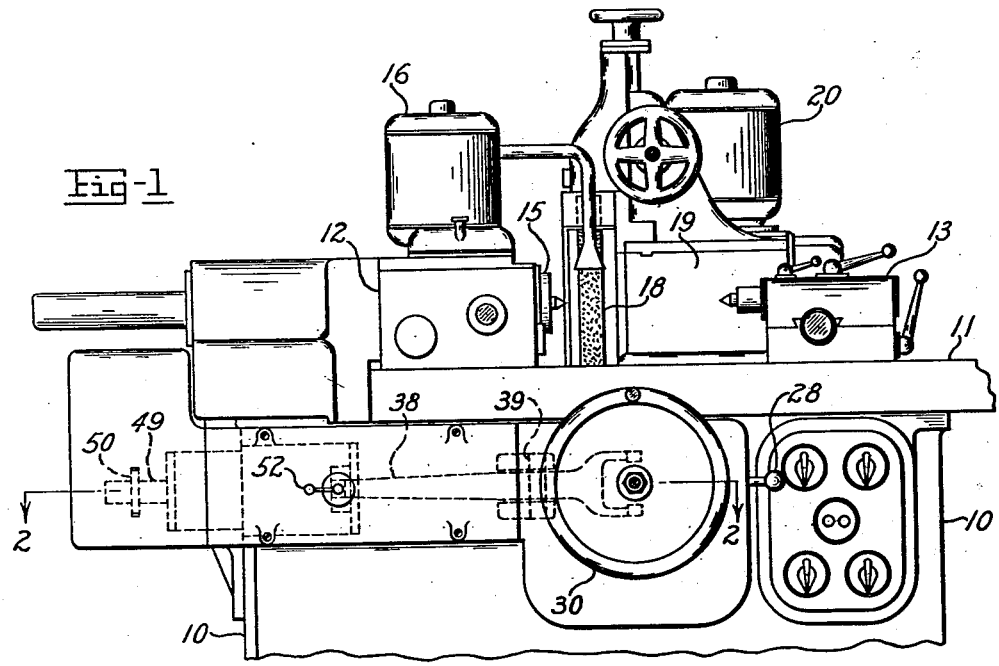
Fig-1
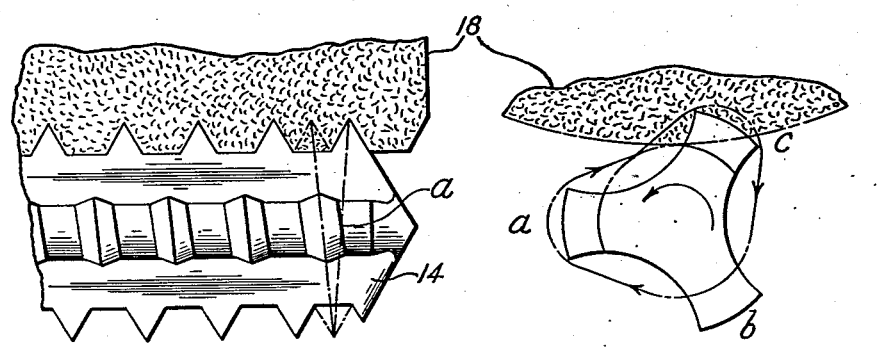
Fig-4
Fig-5
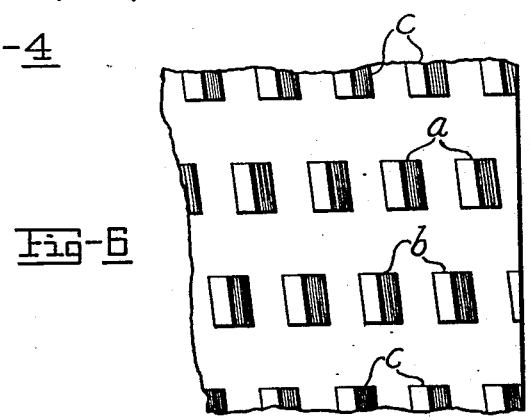
Fig-6
INVENTOR.
Konrad Rauch
BY
Edward T. Noir
atty

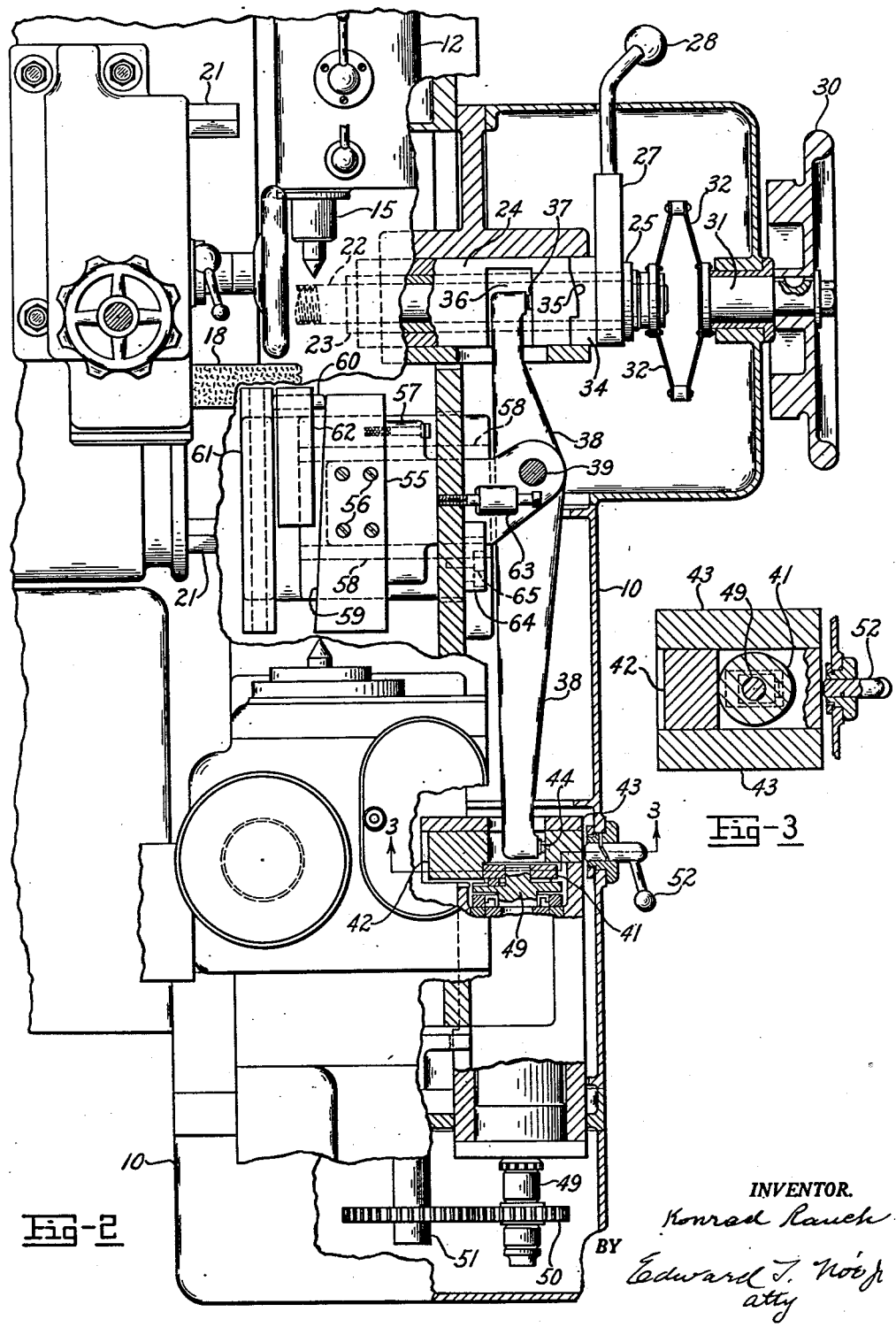

Patented Apr. 20, 1954

2,675,651

UNITED STATES PATENT OFFICE 2,675,651

MACHINE FOR MAKING INTERRUPTED THREADS ON ARCUATELY SPACED LANDS OF OBJECTS

Konrad Rauch, Dayton, Ohio, assignor to The Sheffield Corporation, Dayton, Ohio, a corporation of Ohio Application June 28, 1949, Serial No. 101,881

4 Claims. (Cl. 51—45)

1

This invention relates to grinding machines and more particularly to machines for making an interrupted contour on a part.

In accordance with prior practice in the manufacture of interrupted thread taps, the taps have been provided with full threads and then in a second operation alternate threads are removed as by milling. In accordance with the present invention however, an interrupted thread tap can be made in a single operation by employing a rotatable forming member such as a grinding wheel so formed as to produce a thread while at the same time cutting the land of the tap down to the thread root diameter at each side of the thread. Such a forming member is used in conjunction with a machine having provision for automatically moving the member with respect to the rotating tap blank so that after cutting one land of the blank the forming member is entirely disengaged while the next succeeding land is passing, and then the forming member is reengaged with the blank, thus cutting alternate lands until all of the lands are provided with thread segments that are axially spaced apart and out of helical alignment with adjacent thread segments of adjacent lands.

One object of the invention resides in the method of making an interrupted contour on a part in which the part is rotated while being cut to provide axially spaced contour segments, the cutter and the part being then separated during the continued rotation of the part to leave an area uncut after which the cutter is again engaged with the part until the part is provided with interrupted contour portions that are out of alignment with adjacent contour portions.

Another object of the invention resides in the method of making an interrupted thread tap in which a tap blank is rotated while being ground to provide axially spaced thread segments between a pair of adjacent flutes, the grinding wheel and the blank being then separated during the continued rotation of the blank to leave the area between the succeeding pair of flutes unground after which the grinding wheel is again engaged with another land of the tap until all of the lands are provided with interrupted threads that are out of alignment with adjacent thread segments.

Another object is the provision of a forming machine having a forming cutter that is formed to produce a thread while cutting substantially to the root diameter at each side of the thread to form axially spaced threads, with means for periodically temporarily removing the cutter

2 from the work at predetermined times in the work rotation.

Other objects and advantages of the invention will be apparent from the following description, the appended claims, and the accompanying drawing, in which, Fig. 1 is a front elevation of a machine embodying and for operating in accordance with the present invention;

Fig. 2 is a horizontal section on the line 2—2 of Fig. 1;

Fig. 3 is a section along the line 3—3 of Fig. 2;

Figs. 4 and 5 are detail views showing the manner in which the grinding wheel cooperates with the blank to be threaded; and Fig. 6 is a developed view of the threaded form.

Referring more particularly to the drawing, a machine base 10 supports a longitudinally movable table 11 which operates along suitable guideways on the base and which carries a headstock 12 and a tailstock 13, having centers between which a workpiece may be carried. The workpiece is a blank to be formed with annularly interrupted contours and in the embodiment of the invention herein shown the workpiece is a tap blank having spaced flutes. A portion of such a tap blank after being threaded is illustrated at 14 in Fig. 4. A dog connected to the blank and to the driving head 15 of the headstock produces blank rotation, the driving head being rotated at a suitable speed by an electric motor 16 connected through suitable gearing in the headstock. The gearing may be of the character disclosed in Patent 2,397,504 granted April 2, 1946, and is connected to a lead screw in any conventional manner so that the table 11 will be moved longitudinally at a rate depending on the thread pitch while the blank is rotating one revolution.

The cutter that forms the workpiece is a rotatable formed member adapted to mill or grind the desired contour on the part. As herein illustrated the cutter is a grinding wheel as shown at 18. The wheel is rotatably carried by a wheel head or support 19 and driven by a motor 20, the support being mounted for movement towards and from the work axis on guideways 21 which are arranged on the machine base. Movement of the support towards and from the work axis is effected by a threaded shaft 22 having a threaded connection to the support and adapted to be operated either rotationally or axially. Threaded shaft 22 extends within and is fixed to a sleeve 23 which is slidably arranged in an outer sleeve 24. The sleeve 23 has a flange 25 which bears against the end of a rock arm 27 adapted to be moved by a hand lever extension 28. The sleeve 23 may be rotated by rotating a hand wheel 30 keyed to a stub shaft 31. The end of the shaft and the flange 25 of this sleeve are operably connected by spring blades 32 which permit torque transmission from the hand wheel while permitting the sleeve 23 to move towards and from the stub shaft 31. The rock arm 27 carries a cam member 34 which operates against a cam surface 35 on the outer sleeve 24 as shown in Fig. 2. This outer sleeve is provided with a transverse slot 36 that receives the bifurcated (only one furcation being shown) end of a control arm 38 which is pivotably carried on a bearing pin 39. The end of contact arm 38 bears against a stop 37 on the outer sleeve 24 as will be apparent from Fig. 2. It will be understood that the grinding wheel support is attached to a weight as by means of a chain or cable, not shown, so that the wheel support is normally gravity actuated away from the workpiece, the weight thus acting on the threaded shaft 22 and normally urging it towards the left as viewed in Fig. 2. This holds the flange 25 against arm 27 which holds the cam member 34 against cam 35 and thus holds the outer sleeve 24 against the control arm 38. It will be apparent that if the end of the control arm 38 is moved clockwise as viewed in Fig. 2, it will move the sleeves 24 and 23 towards the right and thus advance the grinding wheel towards the workpiece. If the hand wheel 30 is rotated that will rotate the inner sleeve 23 while the outer sleeve 24 is held against endwise movement by control arm 38 and of course the rotational movements of the inner sleeve 23 will rotate the threaded shaft and produce a gradual movement of the grinding wheel towards or from the workpiece as is required for adjustment or setup purposes. The operator, by rotating lever 28 from the position shown in Fig. 2 may produce a comparatively rapid endwise movement of the inner sleeve 23 towards the right to advance the wheel into the work rapidly, this operation causing the cam 34 to move towards the right while pressing against cam 35, the latter being held against movement since stop 37 is against the control arm 38. As the inner sleeve 23 moves towards the right, the springs 32 are flexed but a torque drive is still effective from the stub shaft 31 to the inner sleeve 23.

The control arm 38 is automatically operated at predetermined times in the sequence of operations and in timed relation to the work rotation so as to retract the grinding wheel from the work after completing the grinding operation on one of the lands of the tap blank and to hold the grinding wheel retracted until the next succeeding land has passed the grinding wheel position, when the grinding wheel is then automatically advanced again into the work. This operation obtains through a cam 41 which bears against a slide block 42 guided for reciprocation in housing walls 43. The slide block has a stop surface 44 engaging the end of the lever 38. It will be understood that as the cam is rotated the lever 38 is oscillated back and forth. Cam 41 is carried on a rotatable shaft 49 which is connected through suitable gearing 50 to a shaft 51 which is driven from the gearing in the headstock 12 in timed relation to the work rotation. A manually operable hand lever 52 can be turned from the position shown in Fig. 2 and thus be moved axially towards the slide block 42 to move the slide block free from the cam and disable the automatic oscillation of lever arm 38.

For grinding a three flute tap the gearing interconnecting the shafts 51 and 49 is such that cam 41 makes three rotations for each two revolutions of the tap blank and disengages the grinding wheel from the blank at a time when a flute is presented towards the wheel. This cam may also be formed to move the wheel through a small distance as the wheel acts on a land of the blank to give radial relief.

For grinding tapered threads as in the production of a pipe thread tap, the bearing pin 39 of the arm 38 is moved in accordance with the thread taper as the work moves axially with respect to the grinding wheel. This is accomplished by a camming or sine bar 55 held by screws 56 to a bracket 57 in which the bearing pin 39 is held, bracket 57 being mounted on guideways 58 in the base of the machine. The sine bar 55 has a straight surface 59 inclined with respect to the work axis in accordance with the amount of taper to be produced. Riding on the surface 59 is a pressure pin 60 which bears at one end against a thrust plate 61 carried by the machine base, pin 60 being supported for endwise movement by a block 62 fixed to the lower side of the table 11. Thus as the table 11 moves longitudinally, the pin 60 is caused to traverse the inclined surface 59 and since thrust plate 61 is fixed, it will move the sine bar, bracket 57, and the fulcrum of the control arm 38 so that the grinding wheel will move transversely of the work axis to give the desired thread taper.

Where the threads to be produced are not tapered the sine bar control of the fulcrum of arm 38 is rendered ineffective by blocking the bracket 57 in such position that pin 60 will not engage the sine bar. Fixed on the bracket is a post 63 so spaced from the front wall of the machine base that it will hold bracket 57 out when a shaftable stop block 64 is interposed between the wall and the post 63. The block 64 is normally held in the retracted position shown by a screw 65 threaded in the front wall of the base and arranged in a slot in the block 64. When the screw is loosened the stop block can be shifted over into the path of the post 63 at a time when the sine bar is holding the bracket in its outer position. Holding screw 65 threaded in the machine base and passing freely through a hole in the bracket post 63 can thus be tightened to clamp the post 63 secure against the base.

The workpiece to be ground may be a fluted tap blank having three or more longitudinally extending flutes, preferably of an odd number such as 3 or 5, and with lands between the flutes having a diameter corresponding substantially to the outside diameter of the thread to be produced. However, where the grinding operation is a finishing operation on a partially formed blank, the threads may be previously roughed out in any suitable manner and in that case the thread blank is one having partially formed threaded portions.

Fig. 4 shows the form of the peripheral portion of the grinding wheel 18. It will be noted that the grinding wheel is provided with thread forming portions adjacent which there are portions that grind the work substantially down to the root diameter. Preferably the grinding wheel has a series of substantially V-shaped grooves with annular surfaces between adjacent grooves, these annular surfaces having a length in the direction of the work axis corresponding to the pitch of the thread to be produced so that the grinding wheel will produce spaced thread segments between which there are spaced thread interruptions as it operates on a land of the blank. In other words the grinding wheel has thread-forming grooves separated by twice the pitch of the threads to be made. The annular surfaces on the grinding wheel do not have to be exactly cylindrical but they should be such as to cut away at least the major portion of the work outside of the thread root diameter and may if desired cut below the thread root diameter.

Figs. 4, 5 and 6 show how a thread blank is ground to produce an interrupted thread tap. Having started the work rotation and work traverse, the operator moves the wheel advancing lever 28 from the position shown to move the grinding wheel towards the work the proper extent to grind the full depth of the thread where the thread is to be produced in a single grinding operation. If the thread is to be first rough ground and then subsequently finished, the movement of the grinding wheel is slightly less than that required to produce a full depth thread. As the work rotates, one of the lands of the tap, land $a$, for example, is ground and then while the flute is adjacent the grinding wheel the cam 41 becomes effective to automatically operate control arm 38 counterclockwise and retract the grinding wheel from the work while the land $c$ passes the grinding wheel. As the next flute comes opposite the grinding wheel, the cam 41 moves the control arm 38 clockwise and thus returns the grinding wheel so that land $b$ is threaded. The grinding wheel is then moved away from the work by the operation of the cam 41 so as to completely miss the previously ground land $a$ and the grinding wheel is returned toward the tap while the next flute passes to then grind land $c$. It will thus be apparent that a three-fluted tap can be ground in about two complete revolutions of the tap blank although, if desired, the cycle may be repeated time after time during axial traverse of the blank to produce threaded lands that are much longer than the width of the grinding wheel. This method may be employed, in grinding interrupted thread taps having more than three flutes by alternately grinding a land and skipping a land during rotational and traverse movements of the tap blank until the blank is completely finished with thread segments axially spaced apart on each of the lands and with each of the thread segments out of helical alignment with adjacent thread segments of adjacent lands. Since the interrupted thread tap can be produced in one machine operation, it will be obvious that the method of this invention provides a very high rate of production with the various thread segments all accurately located with respect to other thread segments.

While the form of apparatus and the method of operation herein described constitute preferred embodiments of the invention, it is to be understood that the invention is not limited thereto and that changes may be made therein without departing from the scope of the invention which is defined in the appended claims.

What is claimed is:

1. A thread grinding machine comprising a base, a grinding wheel head slidably mounted on said base for movement towards and from the work position, a table longitudinally movable on said base, means including a head stock carried by said table for holding and rotating a workpiece, work rotating means, means for traversing said table in time with the work rotation, manually operable means for moving the wheel head, an automatically operable lever for moving the wheel head, cam means for oscillating said lever in time with the work rotation, a movable fulcrum for said lever, and a sine bar controlling said fulcrum in accordance with the longitudinal movement of the table to grind a taper.

2. A threading machine comprising a base, a cutter wheel head slidably mounted on said base for movement towards and from the work position, a table longitudinally movable on said base, means including a head stock carried by said table for holding and rotating a workpiece, work rotating means, means for traversing said table in time with the work rotation, manually operable means for moving the wheel head, a lever for moving the wheel head, cam means operable in timed relation to the work rotating means and engageable with one end of said lever, the other end of the lever having an operable connection to the wheel head for oscillating the wheel head in time with the work rotation, a movable fulcrum block on which said lever is fulcrumed and a sine bar control between the fulcrum block and the table for shifting said block in accordance with the longitudinal movement of the table to cut a taper.

3. A grinding machine for producing three flute interrupted thread taps comprising a base, a grinding wheel having thread forming grooves separated by twice the pitch of the threads to be made and formed to cut a complete thread and to simultaneously cut a surface of approximately thread root diameter and thread root width at each side of the thread on the workpiece, a power drive for said grinding wheel, means for mounting a fluted workpiece to be threaded, supporting means for mounting the wheel and the work on said base for relative movement transverse of the work axis, means for rotating the workpiece about its axis, feeding means connected to said rotating means for relatively moving the grinding wheel and the workpiece axially in timed relation to the workpiece rotation such as to advance the workpiece one thread pitch length for each complete rotation of the workpiece, and means including a cam connected to said rotating means and timed therewith to automatically separate the grinding wheel and the workpiece transversely of the workpiece axis after one land of the fluted workpiece is ground and for holding the grinding wheel and workpiece separated until the next succeeding land is passed or skipped and for then re-engaging the grinding wheel so that after any one land is ground the next land is skipped and after any one land is skipped the next land is ground during the continued rotation of the workpiece.

4. A grinding machine for producing three flute interrupted thread taps comprising a base, a grinding wheel having thread forming grooves separated by twice the pitch of the threads to be made and formed to cut a complete thread and to simultaneously cut a surface of approximately thread root diameter and thread root width at each side of the thread on the workpiece, a power drive for said grinding wheel, a table longitudinally slidable on said base and having a headstock and tailstock for mounting a fluted workpiece to be threaded, a support for mounting the grinding wheel, said support being slidably mounted on said base for movement towards and from the workpiece axis, means for rotating the workpiece about its axis, feeding means connected to said rotating means for longitudinally moving said table in timed relation to the workpiece rotation such as to advance the workpiece one thread pitch length for each complete rotation of the workpiece, and means including a cam connected to said rotating means and timed therewith to automatically move the grinding wheel support transversely of the workpiece axis to separate the grinding wheel and the workpiece after one land of the fluted workpiece is ground and for holding the grinding wheel separated from the workpiece until the next succeeding land is passed or skipped and for then re-engaging the grinding wheel with the workpiece so that after any one land is ground the next land is skipped and after any one land is skipped the next land is ground during the continued rotation of the workpiece, and manually operable means for moving the grinding wheel support independently of its control by said cam means and in a direction towards or from the workpiece.

References Cited in the file of this patent

UNITED STATES PATENTS

| Number | Name | Date |
|---|---|---|
| 1,640,992 | Hanson | Aug. 30, 1927 |
| 1,958,105 | Koehler | May 8, 1934 |
| 2,187,227 | Flanders | Jan. 16, 1940 |
| 2,317,226 | Seyferth | Apr. 20, 1943 |

FOREIGN PATENTS

| Number | Country | Date |
|---|---|---|
| 328,900 | Great Britain | May 8, 1930 |